M. Norris,
Wood Auger Attachment.

Nº 22,195. Patented Nov. 30, 1858.

UNITED STATES PATENT OFFICE.

MARTIN NORRIS, OF BROAD BROOK, CONNECTICUT.

AUGER FOR WOOD.

Specification of Letters Patent No. 22,195, dated November 30, 1858.

*To all whom it may concern:*

Figure 1:
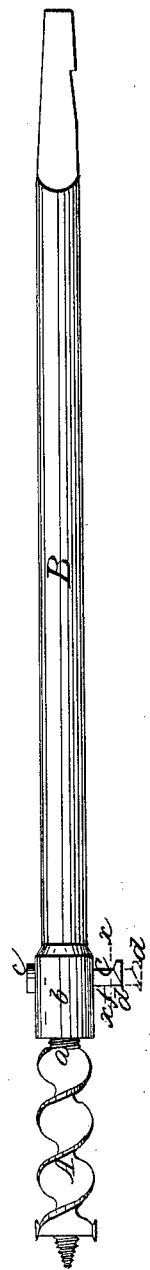
Figure 2:
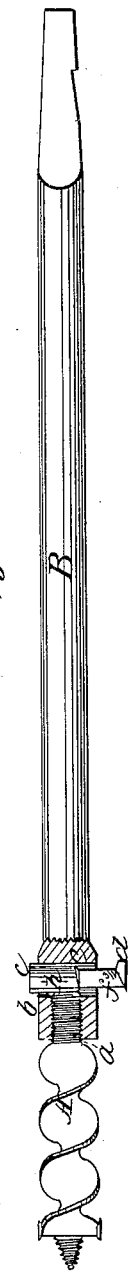
Figure 3:
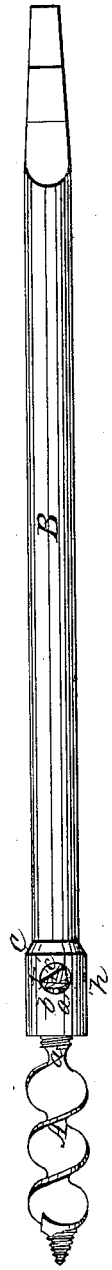

Be it known that I, MARTIN NORRIS, of Broad Brook, in the county of Hartford and State of Connecticut, have invented a new and Improved Auger and Bit Attachment for Boring Holes of Various Sizes; and I do hereby declare that the following is a full and exact description thereof, reference being had to the accompanying drawings, making part of this specification, Figure 1 being a view of a common auger, with a side view of the improved attachment connected therewith; Fig. 2, a similar view, but showing the socket of the attachment in section; Fig. 3, a view of the same in a plane at right angles to that of the former views and showing a section of the adjustable gage cutter, as in the plane indicated at $x$ $x$, Fig. 1.

Like letters designate corresponding parts in all the figures.

My improved attachment is applicable to boring instruments generally, but particularly to the common auger and center-bit; and it has the advantage of being applicable to these instruments, as commonly used, requiring only the shanks thereof to be changed into the form of a screw-shank.

In the drawings, A, represents an ordinary half-inch auger, with a screw-shank $a$, formed on it, to enable the attachment to be applied. The auger is generally shortened so as to leave only the cutter and a turn or two of the "twist," or sufficient to discharge the chips properly.

The attachment is applied with a shank, or shaft, B, which may be formed to use in a common bit-brace, as shown, or provided with a handle, or otherwise arranged, as most convenient. The socket $b$, of this shaft, should be somewhat smaller, in diameter than the "bore" of the auger to be employed; and may, if desired, have spiral grooves in its periphery, to allow the escape of the chips more freely. Transversely through it a hole $g$, is formed, for the reception of the shank $c$, of the attachment cutter C; and longitudinally into the center of the socket, the shank $a$, of the auger or bit is screwed, till it presses against said shank of the attachment cutter, and thus holds it in place. To enable this tightening to be securely effected, a small winch may be employed.

The attachment cutter C, has a chisel edge $f$, for paring up the bottom of the hole, and a "nicker" $d$, for shaping the periphery thereof. The cutter may be set to cut a hole of any radius, within the limits of its size, by simply loosening it, adjusting, and tightening it again, by means of the auger shank. The red lines in Fig. 1, indicate an adjustment of the cutter outward, to cut a larger hole. A scale may be marked on the cutter, as indicated in Fig. 1, for the purpose of more readily adjusting.

Besides the adjustment, as above described, for varying the size of the hole, the attachment cutter is also, by the same means, adjusted, to vary the amount of cut, so as to assist or retard the action of the worm of the auger; or, if the boring tool has no worm, in order to absolutely vary and gage the extent and rapidity of cutting. For this purpose, the lower side $h$, of the cutter shank, is generally, though not necessarily, flattened more or less, as shown, so that, by turning the cutter to the proper position, when the screw-shank $a$, is tightened against it, the hold may be firm and secure. The red lines in Fig. 3, indicate this adjustment, so as to cut faster.

Thus arranged, the instrument is capable of boring a hole of any size larger than the auger A, upward to the limit of the length of the attachment cutter. Several of these, having different lengths, are generally provided. And to cut smaller holes, a smaller auger would be required.

What I claim as my invention and desire to secure by Letters Patent is—

The attachment, applicable to the common auger, bit, or other boring tool in use, and adjustable in the manner and in connection with said auger or other boring tool, substantially as and for the purpose herein specified.

In witness that the above is a true specification of my improved auger and bit attachment, I hereunto set my hand.

MARTIN NORRIS.

Witnesses:
ANDREW HAMILTON,
SALMON NORTH.